J. T. CAMPBELL.
TRY SQUARE.
APPLICATION FILED MAY 4, 1920.
1,379,849.
Patented May 31, 1921.
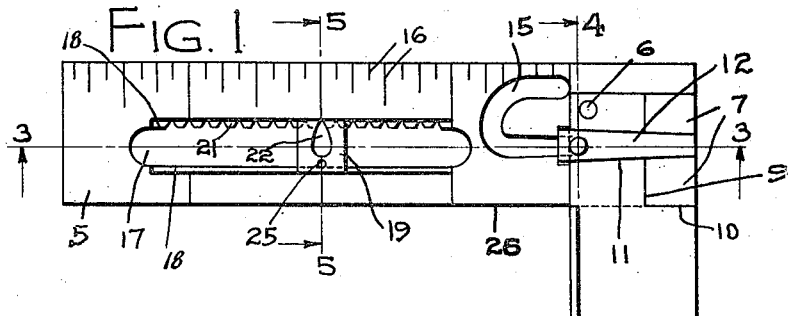
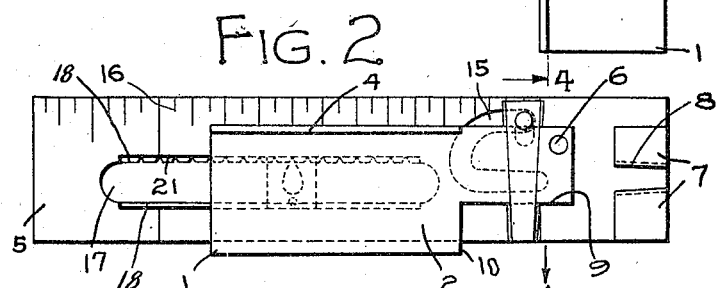
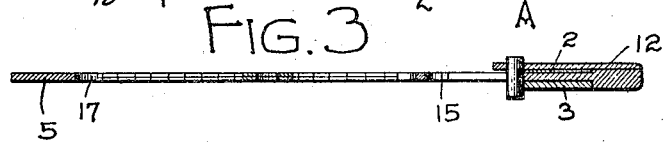
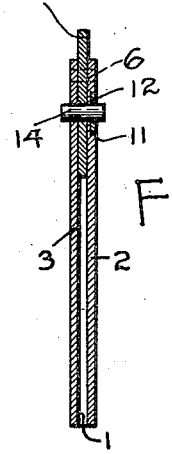
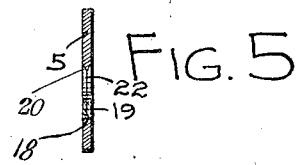
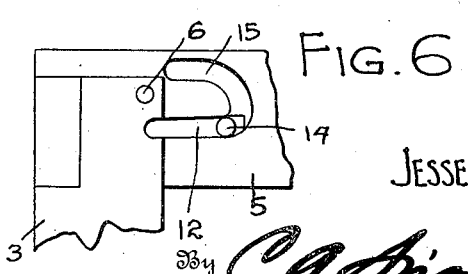
Inventor
JESSE THOMAS CAMPBELL.

UNITED STATES PATENT OFFICE.

JESSE THOMAS CAMPBELL, OF ELBRIDGE, TENNESSEE.

TRY-SQUARE.

1,379,849.  Specification of Letters Patent.  Patented May 31, 1921.

Application filed May 4, 1920. Serial No. 378,918.

*To all whom it may concern:*

Be it known that I, JESSE THOMAS CAMPBELL, a citizen of the United States, residing at Elbridge, in the county of Obion and State of Tennessee, have invented a new and useful Try-Square, of which the following is a specification.

The device forming the subject matter of this application is a try square, and one object of the invention is to provide a try square, the handle of which may be folded with respect to the blade, so that the instrument will occupy but little space in the pocket.

Another object of the invention is to improve the marking gage.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a try square constructed in accordance with the invention, the square being opened for use; Fig. 2 is a side elevation wherein the square is shown folded; Fig. 3 is a section on the line 3—3 of Fig. 1; Fig. 4 is a section on the line 4—4 of Fig. 1; Fig. 5 is a section on the line 5—5 of Fig. 1; and Fig. 6 is a fragmental elevation, showing the opposite side of the tool from that disclosed in Fig. 1.

The tool forming the subject matter of this application preferably, although not necessarily is made of metal throughout and includes a handle 1 which is U-shaped in cross section, the handle 1 comprising walls 2 and 3 provided on their edges with outstanding flanges 4 which afford an increased bearing when the handle of the tool is placed against the work. The numeral 5 denotes a blade, one end of which extends against the walls 2 and 3 of the handle, the blade being connected to the said walls by a pivot element 6. Keepers 7 are formed upon one side of the blade 5, the keepers being undercut as indicated at 8. The walls 2 and 3 of the handle 1 are cut away as indicated at 9, to receive the keepers 7 when the tool is opened out as shown in Fig. 1, and to define a shoulder 10 which, abutting against the edge 25 of the blade 5 disposes the handle 1 at right angles to the blade. An undercut groove 11 is formed in the wall 2 of the handle 1, and in the groove 11, a latch 12 is mounted for right line reciprocation. The latch 12 is provided at its inner end with a cross pin or projection 14, adapted to move in the cam slot 15 formed in the blade 5.

The blade 5 is supplied along its edge with graduations 16. The blade 5 is provided with an elongated opening 17, the edges of which are beveled as shown at 18. The numeral 19 denotes a marking gage mounted to slide in the opening 17, the gage being grooved as indicated at 20, along its edges, to receive the beveled edges 18. For convenience, in manufacture, and to permit the marking gage to be mounted in the opening 17, the gage may be fashioned from two pieces, connected by a securing element 25. One beveled edge which bounds the opening 17 is provided with teeth 21. There is an aperture 22 in the marking gage 19, the aperture being pointed so as to coincide with the space between the teeth 21.

When the tool is in use, as disclosed in Fig. 1, the latch 12 is advanced between the keepers 7, and, thus, the handle 1 is maintained at right angles to the blade 5. The handle 1 may be folded into parallelism with the blade 5, as shown in Fig. 2. When the handle is to be folded, the latch 12 is retracted from between the keepers 7. When the handle 1 is swung into the position shown in Fig. 2 of the drawings, the projection 14 in the latch 12 travels in the cam slot 15 and the latch 12 is advanced transversely of the blade 5 in the direction of the arrow A in Fig. 2, but is not advanced enough so that the latch projects beyond the edge 26 of the blade. Consequently, the latch does not wear the pocket of the user. The advantage in fashioning the cam slot 15 as shown and in providing for an advancing movement of the latch 12, as shown by the arrow A is that in the absence of such a movement, the blade 5 would have to be made unduly wide in order to accommodate the cam slot. The advantage in having the cross pin or projection 14 extend into a slot of any kind is that, owing to such a construction, the latch 12 cannot be completely withdrawn, detached and lost.

When it is desired to mark a line parallel to the edge of a board or the like, the point of a pencil may be placed in the aperture 22 of the marking gage 19 and may be engaged, at the same time, between certain of the teeth 21. The pencil is held in place without difficulty, owing to the presence of the pointed aperture 22.

Having thus described the invention, what is claimed is:—

A device of the class described comprising a blade; a handle pivoted to the blade; a latch slidable in the handle; and a keeper on the blade wherewith the latch engages to hold the handle at an angle to the blade, the latch having a projection, the blade having a cam slot wherein the projection is received, the projection coöperating with the cam slot to move the latch transversely of the blade when the handle is folded with respect to the blade.

In testimony that I claim the foregoing as my own, I have hereto affixed my signature in the presence of two witnesses.

JESSE THOMAS CAMPBELL.

Witnesses:
P. A. LIPPARD,
E. A. WATSON.